United States Patent
Matsuo (10) Patent No.: US 7,031,322 B1
(45) Date of Patent: Apr. 18, 2006

(54) RELAY APPARATUS

(75) Inventor: Shinichiro Matsuo, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 512 days.

(21) Appl. No.: 09/696,807

(22) Filed: Oct. 26, 2000

(30) Foreign Application Priority Data

Mar. 29, 2000 (JP) ............................. 2000-090492

(51) Int. Cl.
*H04L 12/28* (2006.01)
*H04L 12/56* (2006.01)

(52) U.S. Cl. .............................. 370/395.4; 370/395.1; 370/468

(58) Field of Classification Search ............. 370/395.1, 370/395.2, 395.21, 395.4, 395.41, 395.42, 370/395.43, 229, 230, 230.1, 235, 468
See application file for complete search history.

(56) References Cited

U.S. PATENT DOCUMENTS

| | | | | |
|---|---|---|---|---|
| 5,229,992 | A | * 7/1993 | Jurkevich et al. | 370/468 |
| 6,075,791 | A | * 6/2000 | Chiussi et al. | 370/412 |
| 6,088,734 | A | * 7/2000 | Marin et al. | 709/232 |
| 6,307,839 | B1 | * 10/2001 | Gerszberg et al. | 370/235 |
| 6,483,839 | B1 | * 11/2002 | Gemar et al. | 370/395.42 |
| 6,618,391 | B1 | * 9/2003 | Chiussi et al. | 370/418 |
| 6,628,669 | B1 | * 9/2003 | Kago | 370/468 |
| 6,636,481 | B1 | * 10/2003 | Yamaguchi et al. | 370/230 |
| 6,654,345 | B1 | * 11/2003 | Chiussi et al. | 370/231 |
| 6,667,956 | B1 | * 12/2003 | Beshai et al. | 370/238 |
| 2001/0050903 | A1 | * 12/2001 | Vanlint | 370/252 |

* cited by examiner

*Primary Examiner*—Ajit Patel
*Assistant Examiner*—Chirag Shah
(74) *Attorney, Agent, or Firm*—Katten Muchin Rosenman LLP (57) ABSTRACT

There is disclosed the relay apparatus which can detect the data length and the communication time interval of the received packet, and based on these results of detection, set the communication band of a channel for sending out this received packet.

14 Claims, 8 Drawing Sheets

| AUDIO VISUAL APPLICATION | | | CONTROL OF TERMINAL AND ADMINISTRATION | | | DATA APPLICATION | | |
|---|---|---|---|---|---|---|---|---|
| VOICE G.711 G.722 G.723.1 G.728 | IMAGE H.261 | | H.225.0 SIGNAL BETWEEN TERMINAL AND GATEKEEPER (RAS) | H.225.0 CALL CONTROLLING SIGNAL (Q.931) | H.245.0 CONTROLING SIGNAL BETWEEN TERMINAL AND TERMINAL | T.124 | T.125 | |
| H.225.0 (RTP) | | H.225.0 (RTCP) | | | | | | |
| UNRELIABLE TRANSPORT (e. g. UDP) | | | RELIABLE TRANSPORT (e. g. TCP) | | | T.123 | | |
| NETWORK LAYER (e. g. IP) | | | | | | | | |
| DATA LINK LAYER | | | | | | | | |
| PHYSICAL LAYER | | | | | | | | |

FIG. 10

RELAY APPARATUS

BACKGROUND OF THE INVENTION

The present invention relates to a relay apparatus for performing mutual conversion between IP (Internet Protocol) packet and ATM cell in a WAN (Wide Area Network) utilizing an ATM (Asynchronous Transfer Mode) technology.

Conventionally, a method has been known in which WAN is configured by connecting a plurality of LANs (Local Area Network) via an ATM network. For example, in an LAN environment, a protocol of TCP (Transmission Control Protocol)/IP is commonly used to transmit or receive the voice data or image data in the form of IP packet. Also, in the ATM network various kinds of data are transmitted or received in a unit of ATM cell. Therefore, a relay apparatus for performing mutual conversion between IP packet and ATM cell is necessary between the LAN and the ATM network. This relay apparatus performs conversion from the IP packet to the ATM cell, or from the ATM cell to the IP packet.

In the LAN environment utilizing the IP packet, the media communication which has strict limitations for the delay, such as the voice or image communication, assures the QoS (Quality of Service) in such a way that the amount of delay is minimized by setting at "1000" the value of a TOS (Type Of Service) field of 4 bits that is a service type included in an IP header placed at a leading part of an IP packet.

In the ATM environment, a service category can be specified for every virtual connection VC (Virtual Connection), and a fixed bandwidth can be secured by setting this service category at a CBR (Constant Bit Rate). Therefore, QoS with less delay time can be assured, irrespective of whether or not there is communication data.

In the asymmetric xDSLs, there is an Asymmetric DSL (ADSL) modem which is provided with the G.DMT standard having a downstream transmission speed of about 6 Mbits/sec and the G.lite standard having a downstream transmission speed of about 1.5 Mbits/sec. Both of the G.DMT and G.lite standards employ Discrete Multitone (DMT) modulation.

By the way, various kinds of data are transmitted or received using the IP packet in the LAN. In the case where the LAN and the ATM network are connected via a relay apparatus, the IP packet corresponding to media data having strict requirement for real time and the IP packet corresponding to burst data such as FTP (File Transfer Protocol) having less strict requirement for real time are transmitted or received via one IP connection, when an IP connection for transmission or reception of the IP packet and a virtual connection for transmission or reception of the ATM cell are matched. As a result, there was the problem that a suitable service quality cannot be attained to accommodate the virtual connection VC of the ATM network.

For example, in the case where only the IP packets for voice data having severe requirement for real time are transmitted or received on the IP connection, the CBR may be specified as a service category of the virtual connection for ATM. For the FTP data having less severe requirement for real time, a UBR (Unspecified Bit Rate) may be specified as a service category of the virtual connection for ATM. However, in the case where these two kinds of IP packets are mingled on one IP connection, it is impossible to make QoS control for ATM with the service category specified. Therefore, the IP connection and the ATM virtual connection corresponding to these two kinds of IP packets need to be prepared respectively, giving rise to the use of more resources, resulting in the higher operation costs.

SUMMARY OF THE INVENTION

The present invention is provided in the light of the above-described respects, and it is an object of the invention to provide a relay apparatus which can secure a suitable service quality.

A relay apparatus of this invention includes a packet receiving unit for receiving an input packet, data length detecting unit for detecting the data length of said packet received by said receiving unit, time interval detecting unit for detecting the communication time interval of said packet received by said receiving unit, and band setting unit for setting the communication band of a channel for sending out the packet received by the packet receiving unit, based on the data length detected by the data length detecting unit and the communication time interval detected by the time interval detecting unit. The packet includes an actual when the packet itself has been transmitted the time interval is determined by calculating a time interval between said actual time when the packet itself been transmitted and an actual time when another packet has been transmitted, the packet and the other packet received at a different time from each other by said packet receiving unit. Since the communication band is set based on the data length and the communication time interval of received packet, it is possible to secure the communication band necessary in practice to transmit the received packet, and assure a suitable service quality.

Preferably, the band setting unit calculates the communication band by dividing the total value of the data lengths for a predetermined number of packets by the total value of the communication time intervals. By making such a calculation, the data amount to be transmitted per unit of time can be obtained. Thereby, based on this calculated result, the necessary communication band can be obtained.

More preferably, the band setting unit calculates the communication band by multiplying a predetermined value of less than 1 to the value obtained by dividing the total value of the data lengths for a predetermined number of packets by the total value of communication time intervals. By doing such a calculation, it is possible to secure the communication band proportional to the data amount to be transmitted per unit of time, and assure a constant service quality.

In the case where a first packet and a second packet that correspond to high and low service qualities respectively are mingled in the packets received by the packet receiving unit, it is desirable that the band setting unit sets the communication band based on the data length and the communication time interval corresponding to the first packet requiring a high service quality. Since the communication band is set corresponding to the packets requiring high service quality, a necessary and minimal service quality can be assured.

Also in the case where a first packet having strict requirement for real time and a second packet having less strict requirement for real time are mingled in the packets received by the packet receiving unit, it is desirable that the band setting unit sets the communication band based on the data length and the communication time interval corresponding to the first packet. Since the communication band is set corresponding to the packets having strict requirement for real time, a service quality necessary to transmit those packets at minimum can be assured.

The first packet is preferably an IP packet in conformance with the real time transport protocol. This IP packet corresponds to the media data such as voice or images, and is desirably transmitted in shorter delay time. It is possible to realize a high service quality by securing the communication band corresponding to such IP packets.

Preferably, the data length detecting unit detects the data length based on a total length included in an IP header of the IP packet, and the time interval detecting unit detects the communication time interval based on a time stamp included in a real time transport protocol message of the IP packet. Using the total length included in the IP header and the time stamp included in the real time transport protocol message, the data length and the communication time interval corresponding to them can be readily detected.

The relay apparatus of the invention preferably further comprises cell segmentation unit for segmenting the first and second packets received by the packet receiving unit into ATM cells, ATM output control unit for outputting the ATM cells segmented by the cell segmentation unit to an ATM connection as the channel, and switch control unit for controlling the ATM output control unit to output preferentially the ATM cells corresponding to the first packet, when the ATM cells corresponding to the first and second packets are mingled and input into the ATM output control unit. By transmitting the data of the first packet used to set the communication band prior to the data of the second packet, a higher service quality for the data of the first packet can be assured.

It is preferable that the service category of the ATM connection is set to GFR, and a minimum cell rate corresponding to the ATM connection in the switch control unit is set by the band setting unit. By setting the service category and the traffic parameter in this way, the data corresponding to the first packet can be reliably transmitted, and the data corresponding to the second packet can be transmitted in accordance with an idle condition of the band. Therefore, a suitable service quality can be attained in consideration of the degree of significance of the data.

Also, it is preferable that the service category of the ATM connection is set to VBR, and an average cell rate corresponding to the ATM connection in the switch control unit is set by the band setting unit. By setting the service category and the traffic parameter in this way, the data corresponding to the first packet can be reliably transmitted, and the data corresponding to the second packet can be transmitted in accordance with an idle condition of the band. Therefore, a suitable service quality can be attained in consideration of the degree of significance of the data.

Preferably, the band setting unit repetitively sets the communication band at predetermined timings, after the virtual connection is set as the channel. By repetitively setting the communication band, it is possible to assure an optimal service quality at all times.

Preferably, the band setting unit sets the communication band, when a constant virtual connection is set as the channel. Since the communication band is set when setting the constant virtual connection, it is possible to relieve the trouble or processing load required to set necessary communication band.

Preferably, the band setting unit sets the communication band, when a switch type virtual connection is set as the channel. Since the communication band is set every time the switch type virtual connection is set, a suitable communication band can be set for every set connection, and the optimal service quality can be assured.

Preferably, the band setting unit sets the communication band when a call set-up is made in accordance with an upper-level layer protocol that is higher than a hierarchy corresponding to the packet, after a virtual connection is set as the channel. Since the suitable communication band can be set after the call set-up is ended and before the data is actually transmitted, the optimal service quality can be assured in the transmission process that subsequently occurs.

The relay apparatus of this invention is used in a network for transmitting the variable length data using a fixed length packet, and performs the operation of allocating a connection of IP packet having a strict requirement for real time, and a connection having less strict requirement for real time to the same connection that uses a service category capable of assuring the minimum rate. Since the communication band of connection for an IP packet having strict requirement for real time is taken into consideration and the minimum rate for the corresponding connection is set, a suitable service quality for this IP packet can be assured.

DESCRIPTION OF THE PREFERRED EMBODIMENT

A network including a relay apparatus according to one embodiment of the present invention will be described below with reference to the drawings.

Figure 1:
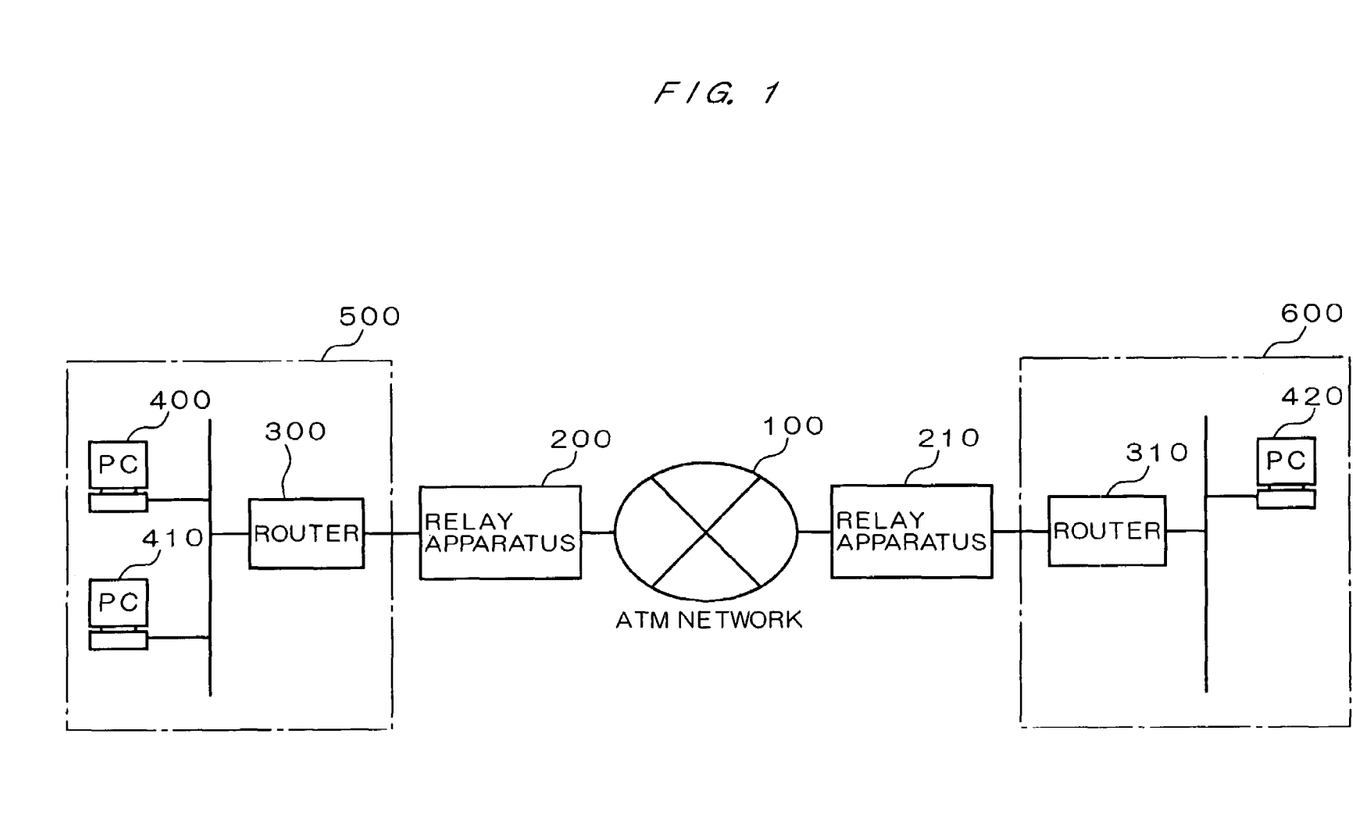
FIG. 1 is a schematic block diagram of a network in one embodiment of the present invention.

FIG. 1 is a schematic block diagram of the network including the relay apparatus according to one embodiment of the invention. As shown in FIG. 1, the network of this embodiment is configured by an ATM network 100, relay apparatuss 200, 210, routers 300, 310, and PCs (personal computers) 400, 410, 420. One LAN 500 is configured to include the PCs 400, 410 and a router 300, this LAN 500 being connected via a relay apparatus 200 to the ATM network 100. Similarly, the other LAN 600 is configured to include a PC 420, and a router 310, this LAN 600 being connected via a relay apparatus 210 to the ATM network 100.

When an IP packet is transmitted from the LAN 500 to other terminal unit (e.g., a PC 420 connected to the LAN 600) connected to the ATM network 100, the relay apparatus 200 accepts the IP packet, converting the input IP packet into the ATM cell to be output to the ATM network 100, as well as converting the ATM cell transferred from the ATM network 100 into the IP packet to be output to the LAN 500. Also, the relay apparatus 200 calculates and sets up the band of virtual connection VC provided between the ATM network 100 and it, based on the communication time interval of the IP packet input from the LAN 500. The other relay apparatus 210 has the same configuration, and is not described in detail here.

In this embodiment, for example, when the PC 400 and the PC 420 intercommunicate in real time by designating an IP address to set up the IP connection, a new data communication such as file transfer which has less strict requirement for real time may occur, if the PC 400 is an FTP server or WWW server. At this time, a lowest cell rate for the virtual connection VC of ATM is automatically set. Also, in the case where the PC 400 and the PC 420 perform voice conversation through VoIP (Voice over IP) communication in real time, the lowest cell rate for the virtual connection VC of ATM is automatically set, even when the video communication having high requirement for real time is started.

Figure 2:
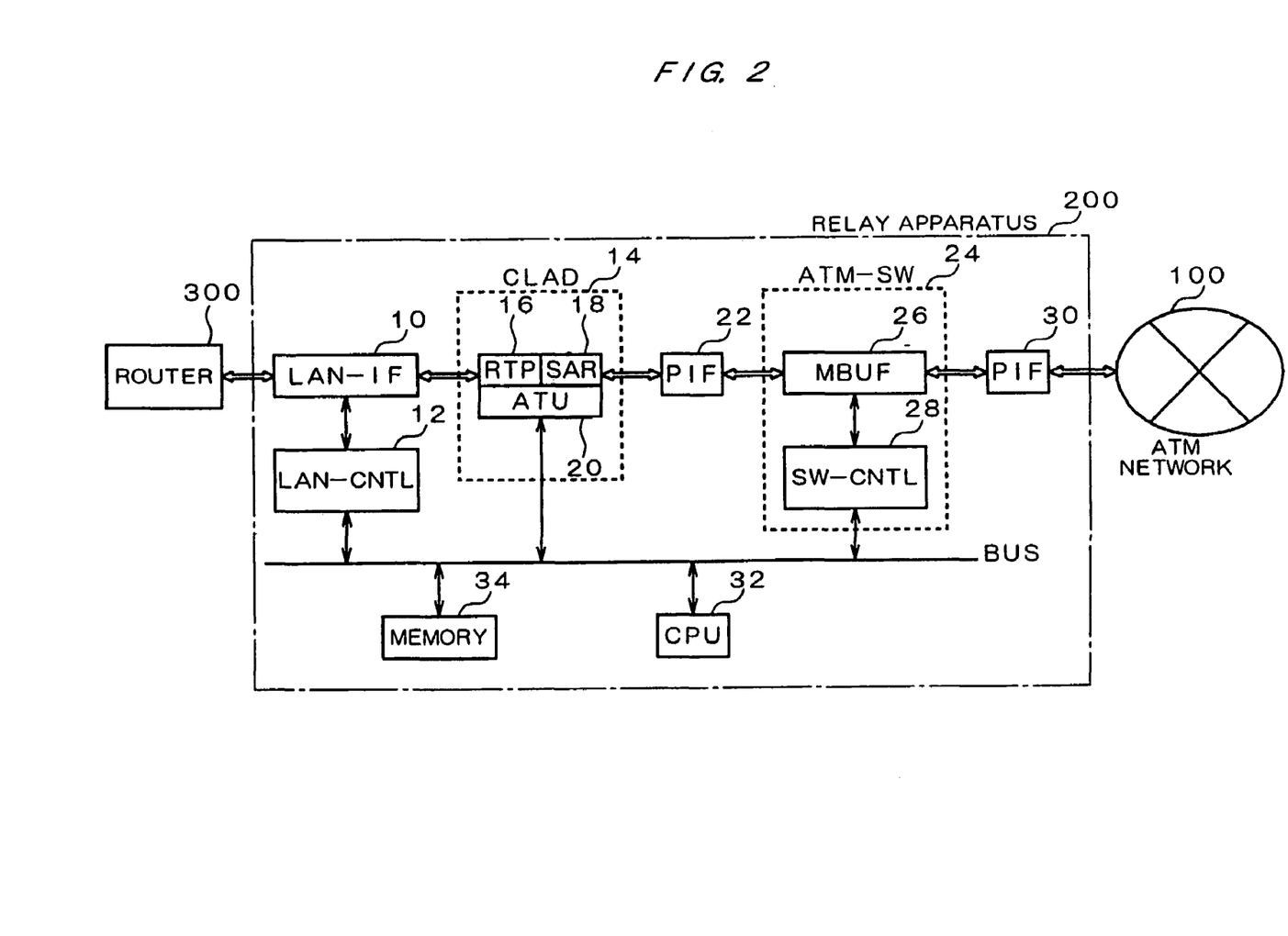
FIG. 2 is a detailed block diagram of a relay apparatus included in the network as shown in FIG. 1.

FIG. 2 is a diagram showing the detailed configuration of the relay apparatus. The relay apparatus 200 is configured to include a LAN interface (LAN-IF) 10, a LAN controller (LAN-CNTL) 12, a CLAD (Cell Assembly Disassembly) 14, PIF (Port Interface) 22, 30, an ATM switch (ATM-SW) 24, a CPU 32, and a memory 34.

The LAN interface 10 is used to connect physically the relay apparatus 200 to the LAN 500. For example, a cable such as 100 Base-T is connected. The LAN controller 12 controls the input and output operations of signals via the LAN interface 10.

The CLAD 14 is to perform mutual conversion between IP packet and ATM cell, segmenting an IP packet input via the LAN interface 10 into one or more cells, and reassembling one or more cells input from the ATM network 100 into an IP packet. In order to effect segmentation and assembly, the CLAD 14 comprises an RTP (Real-time Transport Protocol) unit 16, a SAR (Segmentation and Reassembly) unit 18, and an ATU (Address Transfer Unit) 20. The RTP unit 16 analyzes an RTP message included in the input IP packet, extracting the value of a time stamp contained in this message, or creating an RTP message included in the IP packet in producing the IP packet. The segmentation/reassembly unit 18 segments an IP packet into the ATM cells, and reassembles the ATM cells into an IP packet. The address transfer unit 20 performs the transfer between an IP header and a cell header. For example, when the IP packet is segmented into the ATM cells, the cell header is created based on the IP header, or on the contrary, when the ATM cells are reassembled into the IP packet, the IP packet is created based on the cell header. The detailed contents of the IP header and the RTP message included in the IP packet will be described later. The port interfaces 22, 30 accommodate the physical lines of ATM.

The ATM switch 24 switches the transmission destination of ATM cells. This ATM switch 24 comprises an MBUF (Message Buffer) 26, and a SW-CNTL (Switch-Controller) 28. The message buffer 26 stores temporarily the ATM cells input from the CLAD 14 or via the ATM network 100. The switch controller 28 controls the addressing, scheduling and queuing for the ATM cells stored in the message buffer 26. For example, when an IP packet including an RTP message and an IP packet not including RTP message are mingled and input into the relay apparatus 200, the switch controller 28 controls to preferentially transmit the ATM cells corresponding to the IP packet including the RTP message.

The CPU 32 controls the whole of the relay apparatus 200. Also, the CPU 32 calculates the value of traffic parameter, based on the communication time interval and the data length of the IP packet input from the LAN 500, and sets the band of virtual connection between the ATM switch 24 and the ATM network 100. More specifically, the CPU 32 sets the value of a minimum cell rate mCR that is one of the traffic parameters to secure a necessary band corresponding to the virtual connection VC with the service category set at the GFR (Guaranteed Frame Rate). A specific way of setting the minimum cell rate will be described later. The memory 34 stores an operation program for the CPU 32 and a working area.

The LAN interface 10 and the LAN controller 12 correspond to packet receiving unit; the CPU 32 corresponds to data length detecting unit and time interval detecting unit; the CPU 32 and the memory 34 correspond to band setting unit; the CLAD 14 corresponds to cell segmentation unit; the ATM switch 24 corresponds to ATM output control unit; and the switch controller 28 corresponds to switch control unit.

The network and the relay apparatus 200 in this embodiment have the above configuration. Next, explanation will be given of an operation of securing the band of ATM virtual connection VC, based on an IP packet to be input into the relay apparatus 200.

Figure 3:
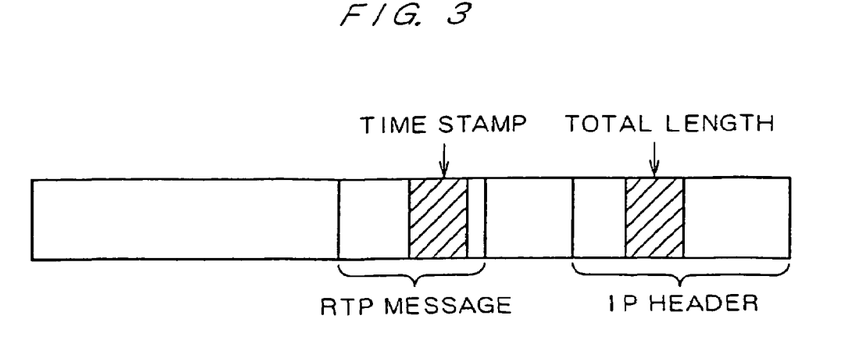
FIG. 3 is a diagram showing the format of an IP packet.

FIG. 3 is a diagram showing the format of an IP packet. An IP header is included at a leading part of the IP packet, and an RTP message is included at a predetermined location within the IP packet.

Figure 4:
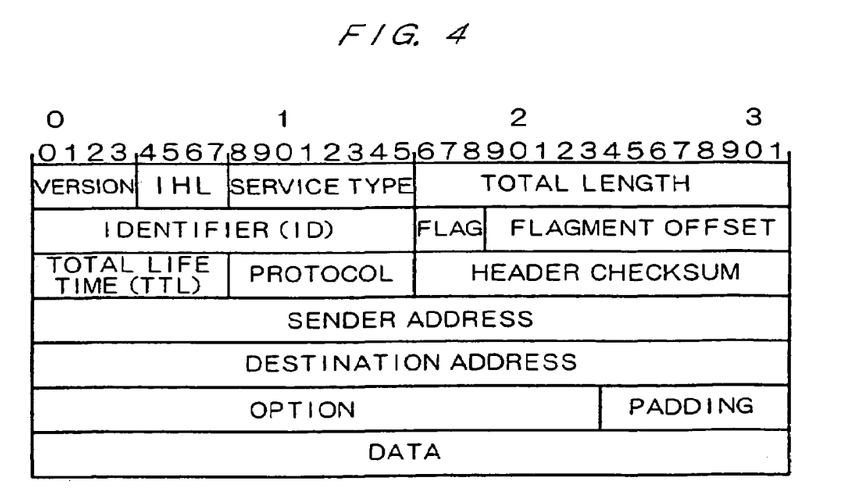
FIG. 4 is a diagram showing the format of an IP header.

FIG. 4 is a diagram showing the format of the IP header. As shown in FIG. 4, the IP header is configured to include "version," "IHL," "service type," "total length," "identifier (ID)," "flag," "fragment offset," "total lifetime (TTL)," "protocol," "header checksum," "sender address," "destination address," "option," and "padding."

The "version" is a field indicating the version of IP. The "IHL (Internet Header Length)" is a field indicating the length of IP header in a unit of 32 bits. The "service type" is a field indicating the service type of IP being transmitted. The "total length" is a field indicating the length of IP header and the IP data following the IP header in a unit of octet (byte).

The "identifier" is a field containing an identification code for identifying a plurality of IP packets to be restored to the original data on the reception side, when the data is divided into the plurality of IP packets on the transmission side. The value of this identifier is set on the transmission side. The "flag" is a control field for use when the transmission data is divided into a plurality of IP packets. The "fragment offset" is a field indicating the number of divided data at which this IP packet is located.

The "total lifetime (TTL)" is a field indicating the time during which the IP packet can exist within the network. The "protocol" is a field for setting the value of identifying a protocol type at the upper level (layer 4). The "header checksum" is a field for use in error check of the IP header. The "sender address" is a field for setting the IP address of the originator (source). The "destination address" is a field for setting the IP address of destination. The "option" is a field for use in transmitting the information which is not included in the standard IP header. The "padding" is a field for use to set the whole length of option field to a multiple of four octets.

Figure 5:
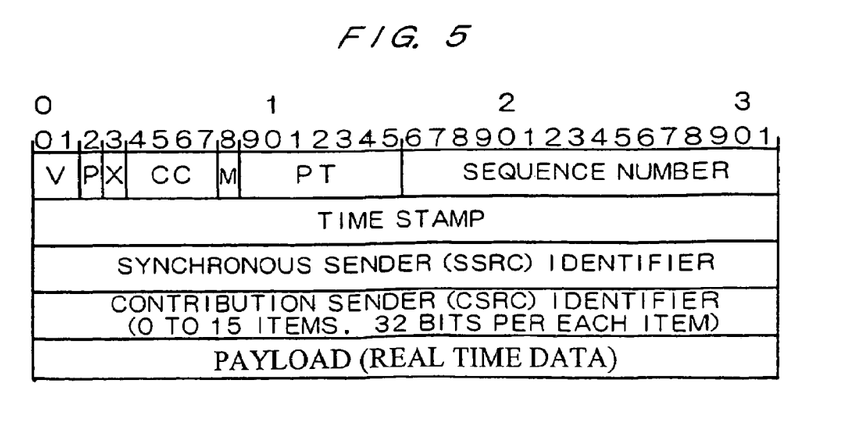
FIG. 5 is a diagram showing the format of an RTP message.

FIG. 5 is a diagram showing the format of an RTP message. As shown in FIG. 5, the RTP message is configured to include "V," "P" "X" "CC," "M," PT," "sequence number," "time stamp," "SSRC (synchronous sender) identifier," and "CSRC (contribution sender) identifier."

The "V (Version)" is a field indicating the RTP version. The "P (Padding)" is a field indicating whether or not any extra byte is added to this IP packet. The "X (extension)" is a field indicating an extension bit, in which a predetermined value is set when an extended header is provided after a basic RTP header. The "CC (Csrc Count)" is a contribution sender count, and a field indicating the number of contribution sender identifiers which this message includes.

The "M (Marker)" is a marker bit, and a field usable for the application to mark the boundary of data. The "PT" is a field indicating the PT (Payload Type) of message. The "sequence number" is a field indicating the natural number which is assigned in the order transmission of the IP packet.

The "time stamp" is a field indicating the time when a leading byte of this IP packet has been transmitted. The "synchronous sender identifier" is used to identify the sender of this IP packet by referring to a system having designated a sequence number for this IP packet and a time stamp. The "contribution sender identifier" is used to identify the original sender of this IP packet.

Following the RTP message, the voice or image payload (real time data) is included.

Figure 6:
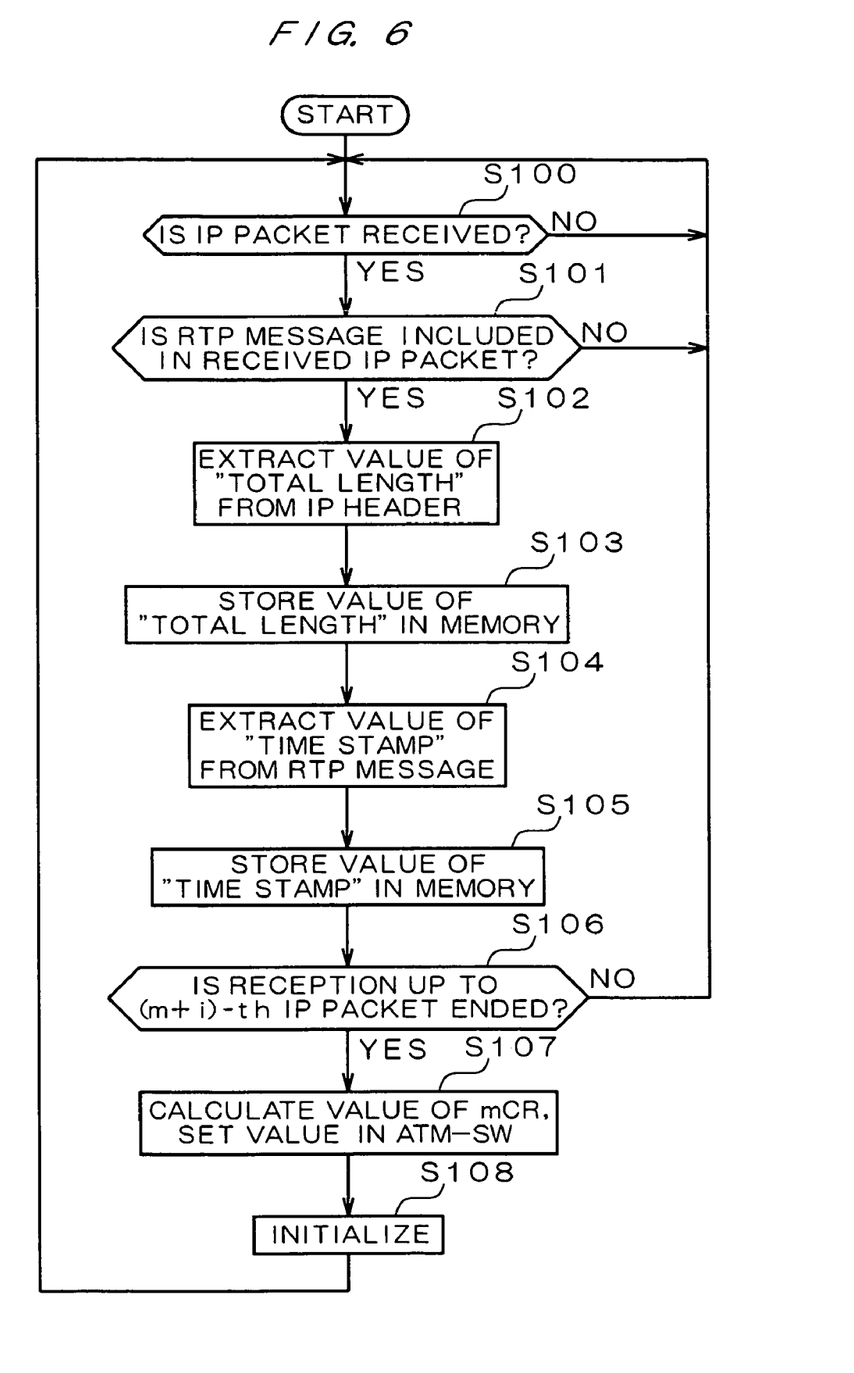
FIG. 6 is a flowchart showing an operation procedure for setting the band of an ATM virtual connection in a relay apparatus.

FIG. 6 is a flowchart showing an operation procedure for setting the band of ATM virtual connection VC in the relay apparatus 200 in which the IP packets corresponding to various kinds of service type are input into the relay apparatus 200 from the PC 400 connected to the LAN 500.

The CPU 32 determines whether or not an IP packet has been received at the LAN interface 10 (step S100), and if received, whether or not any RTP message is included in this received IP packet (step S101). If the IP packet is not received (negative determination at step S100), or if the IP packet has been received but no RTP message is included (negative determination at step S101), the procedure returns to step S100 to repeat determination of whether or not the IP packet has been received.

If the RTP message is included in the received IP packet, an affirmative determination is made at step S101. Then, the CPU 32 extracts the value L (m) of "total length" included in the IP header (step S102), and stores it in the memory 34 (step S103). The CPU 32 extracts the value T(m) of "time stamp" included in the RTP message within the IP packet (step S104), and stores it in the memory 34 (step S105).

Figure 7:
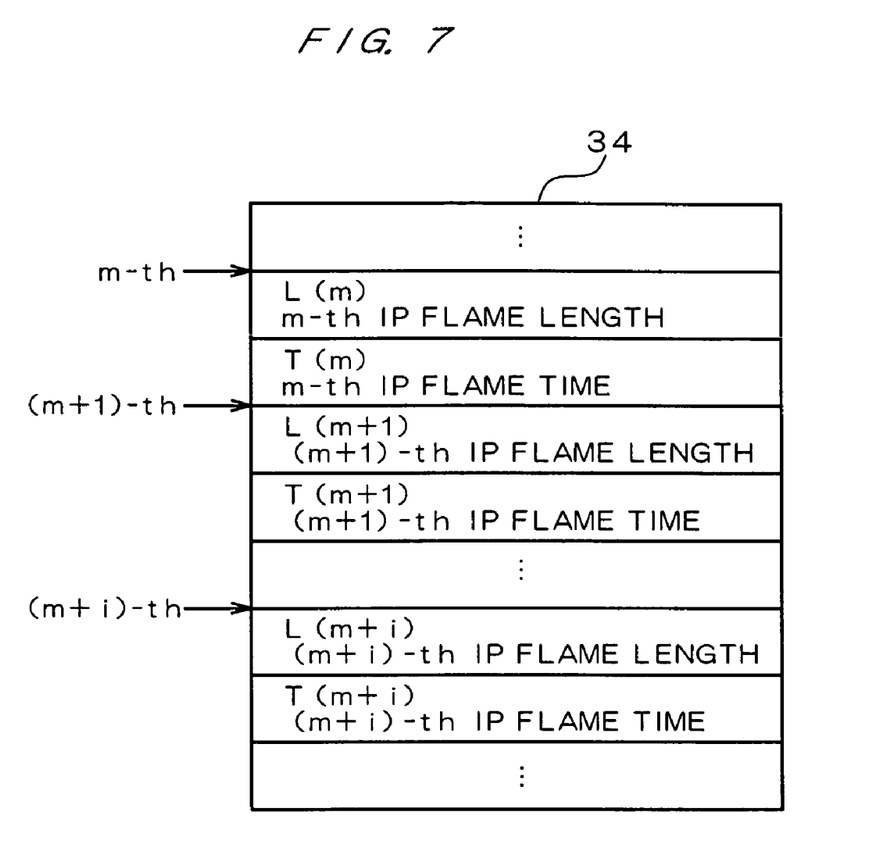
FIG. 7 is a diagram showing a stored state of a memory within the relay apparatus.

FIG. 7 is a diagram showing the storage contents of the memory 34. As shown in FIG. 7, the memory 34 has a storage area corresponding to each of the i+1 IP packets numbered from the first (m-th) IP packet, which is noted for calculation of the band, the "total length" value L(m) and the "time stamp" value T(m) for each IP packet being stored in each storage area. The number (i+1) of IP packets for storing the "total length" and the "time stamp" is preset. This storing operation is continued until all the values corresponding to the (i+1) IP packets are stored in the memory 34.

The CPU 32 determines whether or not the reception up to the (m+i)-th IP packet has been ended (step S106). If not received, a negative determination is made, and the procedure returns to a determination at step S100 to repeat the processing. If the reception up to the (m+i)-th IP packet has been ended, an affirmative determination is made at step S106. Then the CPU 32 calculates a minimum cell rate mCR in accordance with a predetermined expression of calculation, and sets this value to the switch controller 28 within the ATM switch 24 (step S107). Thereafter, a parameter i which is used to count the number of IP packets is initialized. The procedure returns to step S100 to repeat a series of band setting operations.

Figure 8:
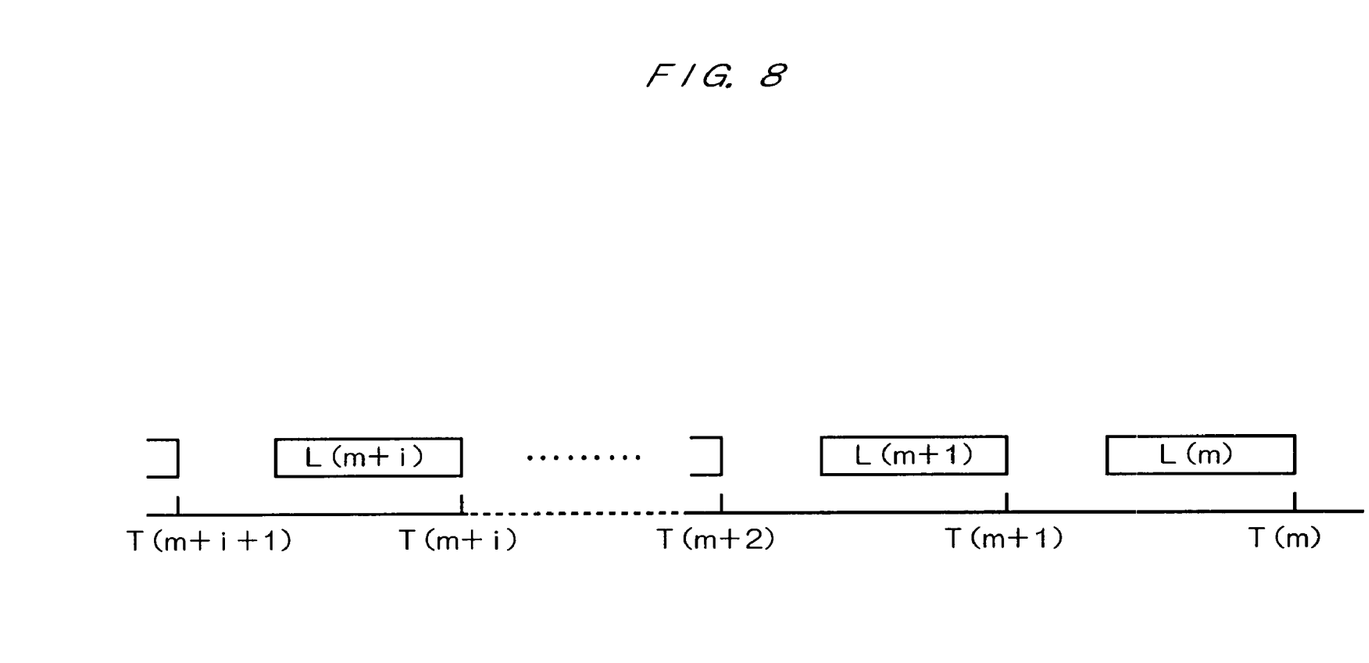
FIG. 8 is an explanatory diagram for a specific calculation method of a minimum cell rate.

FIG. 8 is an explanatory diagram for a specific calculation method of the minimum cell rate mCR. In FIG. 8, it is supposed that the "total length" value for the m-th IP packet is L(m), and the "time stamp" value included in the RTP message is T(m). Similarly, it is supposed that the "total length" value and the "time stamp" value corresponding to the (m+1)-th IP packet are L(m+1) and T(m+1), respectively. Also, it is supposed that the "total length" value and the "time stamp" value corresponding to the (m+2)-th IP packet are L(m+2) and T(m+2), respectively. Further, it is supposed that the "total length" value and the "time stamp" value corresponding to the (m+i)-th IP packet are L(m+i) and T(m+i), respectively.

Taking into consideration the m-th IP packet alone, the amount of received data per unit of time is calculated such as:

$$A=L(m)/(T(m+1)-T(m)) \qquad (1)$$

Since the user information of 48 bytes is contained in one cell, the data amount A per unit of time divided by 48 is defined as the value A', which is the number of cells transmitted or received per unit of time, i.e., cell rate.

Taking into consideration the m-th and (m+1)-th IP packets, the amount of received data B per unit of time is calculated such as:

$$B=(L(m)+L(m+1))/(T(m+2)-T(m)) \qquad (2)$$

Accordingly, the number of cells B' transmitted or received per unit of time is equal to the value obtained by dividing the value B by 48.

Similarly, taking into consideration the m-th to (m+i)-th IP packets, the amount of received data P per unit of time is calculated such as:

$$P=(L(m)+L(m+1))+ \ldots +L(m+i))/(T(m+i+1)-T(m)) \qquad (3)$$

Accordingly, the number of cells P' transmitted or received per unit of time is equal to the value obtained by dividing the value P by 48.

In this way, in the relay apparatus 200 of this embodiment, if an IP packet corresponding to the media data such as voice or images including an RTP message is input from the LAN 500, the minimum cell rate mCR of the virtual connection VC with the service category set at GFR is set so that at least this IP packet can be transmitted. Accordingly, it is possible to secure a minimum of band which can transmit the ATM cells segmented from the IP packet for media data having strict requirements for the service quality and real time. Also, the IP packet having less strict requirement for real time (e.g., IP packet corresponding to the FTP) can be transmitted at a timing depending on the size of the band that has been practically secured.

The present invention is not limited to the above embodiment, but may be modified in various ways within a scope of the invention. For example, in the above embodiment, the minimum cell rate mCR of the virtual connection VC is set every time the (i+1) IP packets including the RTP message are received, as described using a flowchart of FIG. 6. However, the set timing of this minimum cell rate mCR can be varied differently. Alternate embodiments (1) to (3) of the set timing for the minimum cell rate mCR will be described below.

(1) When the Minimum Cell Rate is Set after Establishment of the PVC (Permanent Virtual Connection)

In the case where the permanent virtual connection PVC is used as the ATM connection, the value of the minimum cell rate mCR calculated once may not fluctuate greatly in some cases. In such a case, after establishment of PVC, the minimum cell rate mCR may be first calculated once, and this calculated value set in the ATM switch 24. Thereby, the processing load of the CPU 32 can be relieved.

(2) When the Minimum Cell Rate is Set after Establishment of the SVC (Switched Virtual Connection)

In the same way as above, the minimum cell rate may be calculated after establishment of the switched virtual connection SVC. That is, every time the SVC is set, the minimum cell rate mCR may be calculated first only once, and this calculated value set in the ATM switch 24. Thereby, the load of the CPU 32 can be relieved as compared with the case where the minimum cell rate mCR is calculated at all times. Since the minimum cell rate mCR is set every time the switched virtual connection SVC is set, the optimal communication band, i.e., service quality can be assured for every set connection.

(3) When the minimum cell rate is set after call setting by the application

In the same way as above, the minimum cell rate may be calculated after establishment of the switched virtual connection SVC. That is, every time the SVC is set, the minimum cell rate mCR may be calculated first only once, and this calculated value set in the ATM switch 24. Thereby, the load of the CPU 32 can be relieved as compared with the case where the minimum cell rate mCR is calculated at all times. Since the minimum cell rate mCR is set every time the switched virtual connection SVC is set, the optimal communication band, i.e., service quality can be assured for every set connection.

Figure 9:
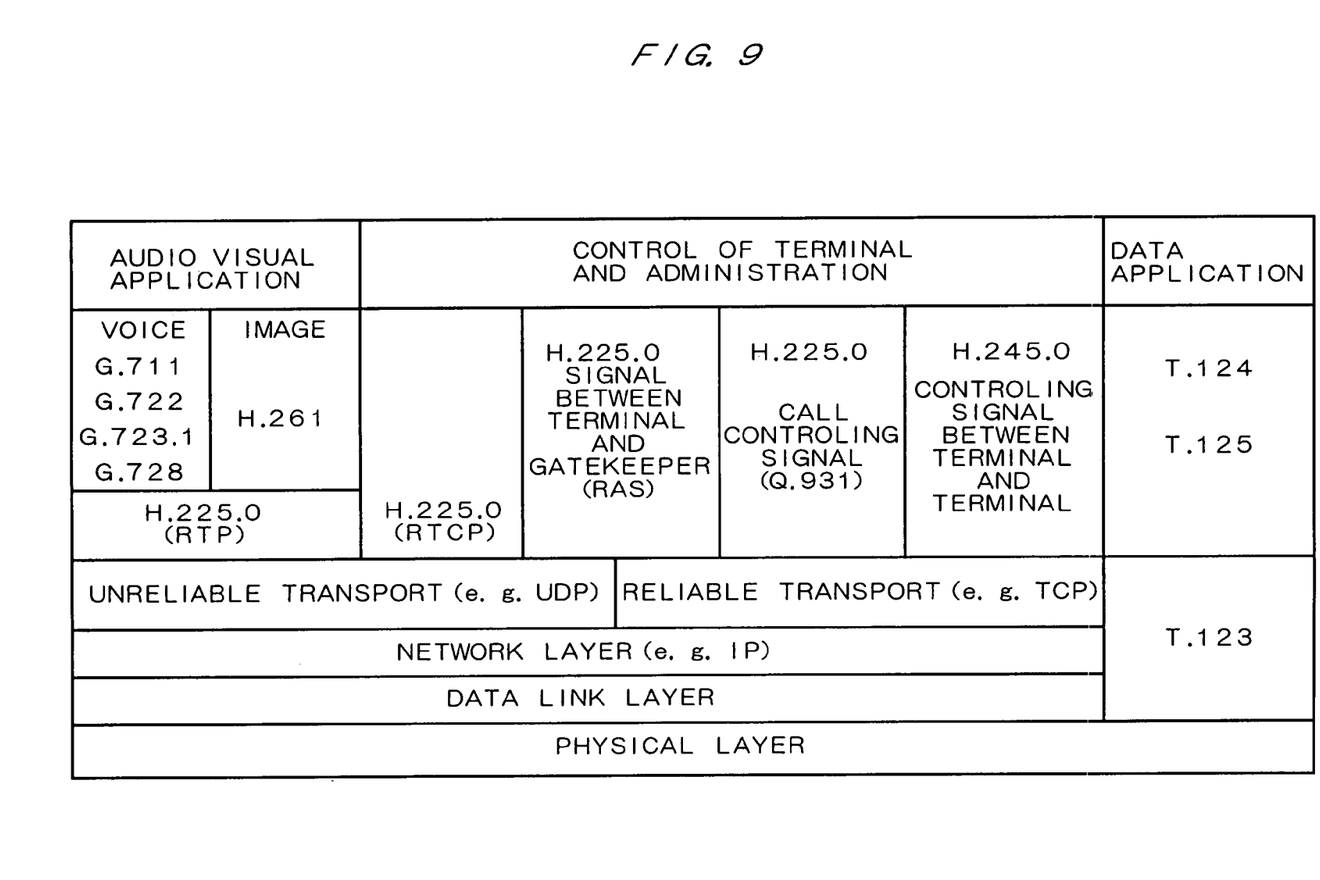
FIG. 9 is a table showing the protocol configuration defined with H.323.

FIG. 9 is a diagram showing the protocol configuration as defined in accordance with H.323. This H.323 is a protocol system for voice/image/data communications on the IP network without guarantee of service quality, which was instituted by the ITU (International Telecommunication Union). The details of H.225 signaling are defined in Q.931.

For example, considering a case where the connection is established between a PC 400 and a PC 420, after a request of establishing TCP connection (SYN) is transmitted from the PC 400 to the PC 420, an acknowledgement of establishing TCP connection (ACK) is returned from the PC 420 to the PC 400. Then, a call Setup between these two PC 400 and PC 420 is made in accordance with Q.931. More specifically, after a Setup message is transmitted from the PC 400 to the PC 420, a Connect message is returned from the PC 420 to the PC 400, so that a call Setup can be made.

In this way, after the virtual connection VC of ATM having the GFR set as the service category is set, establishment of TCP connection and a call Setup with Q.931 can be made between the PC 400 and the PC 420. Thereafter, the minimum cell rate mCR may be calculated only once, and this calculated value set in the ATM switch 24. In practice, the transmission or reception of payload (real time data) of RTP occurs after the negotiation of communication function and the opening procedure of logical channel are executed in accordance with H.245. At this time, if a suitable service quality is provided, there is no trouble in the communication of real time data. As described above, there is the advantage that the load of the CPU 32 can be relieved, like the case where the minimum cell rate mCR is set immediately after establishment of PVC or SVC.

In the above embodiment, the service category of ATM is specified at GFR, and the value of the minimum cell rate mCR which is one of the traffic parameters is calculated and set up. However, the VBR (Variable Bit Rate) may be specified as the service category, and the value of an SCR (Sustainable Cell Rate) that is one of the traffic parameters may be calculated and set up. The specific value of the sustainable cell rate SCR may be directly any value of the minimum cell rate mCR which is calculated using the above expressions (1) to (3). Also, the timing of setting the sustainable cell rate SCR may be set once immediately after establishment of PVC or SVC, or set after a call setup in the application, besides the case where it is repetitively set at all times as shown in FIG. 6.

In the above embodiment, the total value of data for the received IP packets divided by the total value of communication time interval is converted into the number of cells. This calculated result is made coincident with the minimum cell rate mCR (or sustainable cell rate SCR). However, this calculated result may be multiplied by a predetermined value of less than 1, and made coincident with the minimum cell rate mCR or sustainable cell rate SCR. In this case, the ATM cells corresponding to the IP packet including the RTP message may not be transmitted but discarded in some cases. However, since the data having strict requirement for real time can be transmitted at constant rate and reliably, a constant service quality can be assured at all times.

In the above embodiment, the communication time interval of IP packet is found based on the time stamp included in the RTP message within the received IP packet. However, the communication time interval may be detected by measuring the arrival time interval of IP packet which is practically input into the LAN interface 10. Also, in the above embodiment, paying attention to only the IP packet corresponding to the RTP, the minimum cell rate mCR and the sustainable cell rate SCR are set up. However, the present invention is applicable to the IP packet data having strict requirement for real time or the packet data other than IP.

Also, the CBR (Constant Bit Rate) may be specified as the service category, and the value of PCR (Peak Cell Rate) may be calculated and set up. In this case, it follows that the value of n times the band for assuring the service quality is specified.

In the above embodiment, the relay apparatus 200 comprises the ATM switch 24. However, the relay apparatus 200 may not comprise the ATM switch 24.

Figure 10:
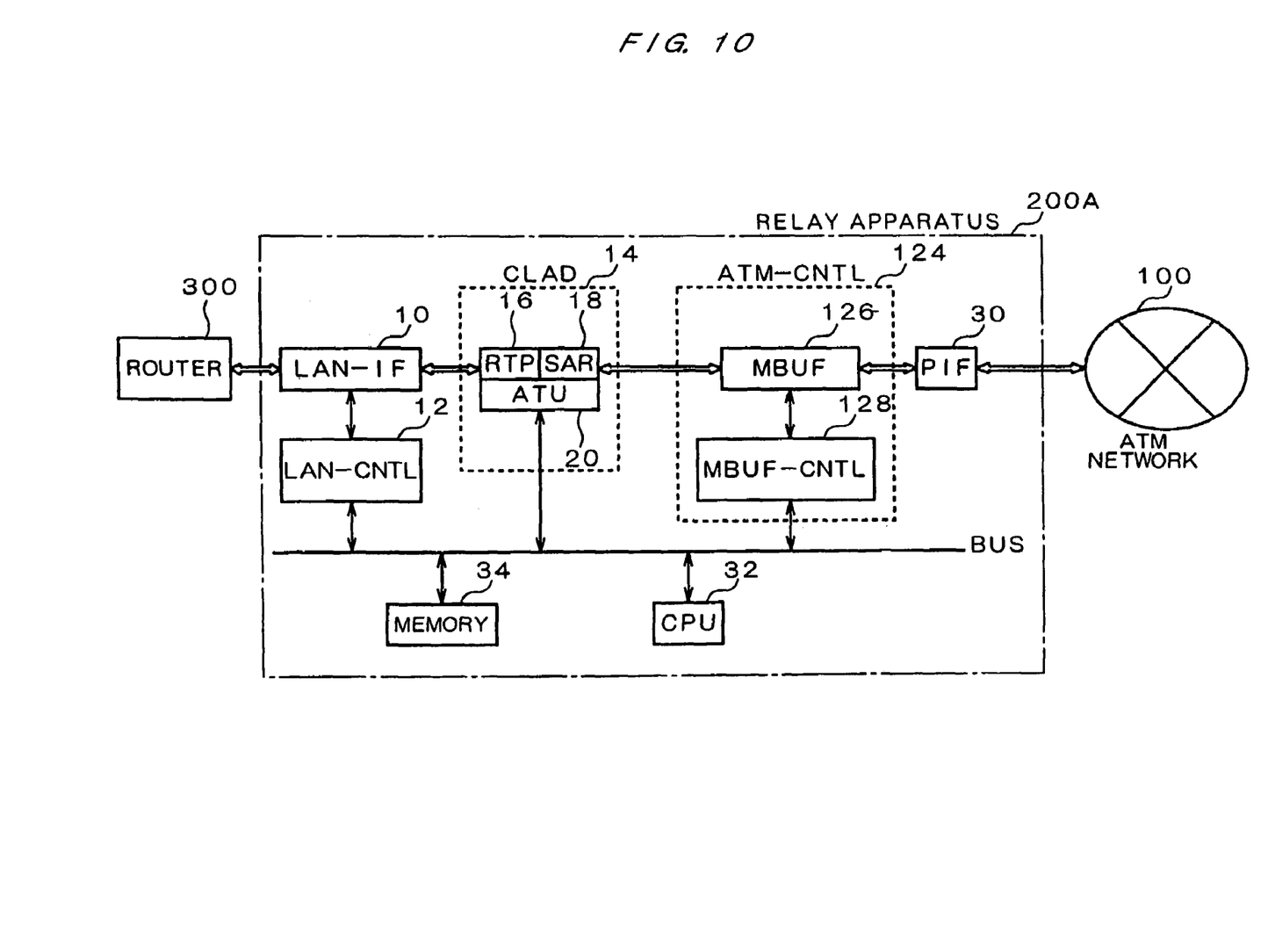
FIG. 10 is a configuration diagram showing an alternate embodiment of the relay apparatus.

FIG. 10 is a configuration diagram showing an alternate embodiment of the relay apparatus. A relay apparatus 200A as shown in FIG. 10 has a configuration where the ATM switch 24 and the port interface 22 included in the relay apparatus 200 as shown in FIG. 2 are replaced with an ATM controller (ATM-CNTL) 124. This ATM controller 124 comprises a message buffer (MBUF) 126, and a message buffer controller (MBUF-CNTL) 128. The message buffer 126 temporarily stores the ATM cell input from the CLAD 14 or the ATM network 100. The message buffer controller 128 controls the scheduling and queuing of ATM cells stored in the message buffer 126. For example, in the case where the IP packet including the RTP message and the IP packet not including the RTP message are mingled and input into the relay apparatus 200A, the message buffer controller 128 controls to transmit the ATM cells corresponding to the IP packet including the RTP message preferentially. The above-described ATM controller 124 corresponds to ATM output control unit.

The invention claimed is:

1. A relay apparatus comprising:
   packet receiving unit for receiving an input packet, wherein said packet includes an actual time when said packet itself has been transmitted;
   data length detecting unit for detecting a data length of the packet received by the receiving unit;
   time interval detecting unit for detecting the communication time interval of the packet received by said packet receiving unit by means of calculating a time interval between said actual time when the packet itself has been transmitted and an actual time when another packet has been transmitted, the packet and the other packet received at a different time from each other by said packet receiving it; and
   band setting unit for setting the communication band of a channel for sending out the packet received by said packet receiving unit, based on the data length detected by said data length detecting unit and the communication time interval detected by said time interval detecting unit.

2. The relay apparatus according to clam 1, wherein said band setting unit calculates said communication band by dividing the total value of said data lengths for a predetermined number of packets by the total value of said communication time intervals for them.

3. The relay apparatus according to claim 1, wherein said band setting unit calculates the communication band by multiplying the total value of the data lengths for the predetermined number of packets divided by the total value of communication time intervals for them by a predetermined value of less than 1.

4. The relay apparatus according to claim 1, wherein a first packet and a second packet corresponding to high and low service qualities respectively are mingled in the packets received by said packet receiving unit, and said band setting unit sets the communication band based on the data length and the communication time interval corresponding to the first packet requiring a high service quality.

5. The relay apparatus according to claim 1, wherein a first packet having strict requirement for real time and a second packet having less strict requirement for real time are mingled in the packets received by said packet receiving unit, and said band setting unit sets the communication band based on the data length and the communication time interval corresponding to the first packet.

6. The relay apparatus according to claim 4, wherein the first packet is an IP packet conforming with the real time transport protocol.

7. The relay apparatus according to claim 6, wherein said data length detecting unit detects the data length based on the total length contained in an IP header of the IP packet, and said time interval detecting unit detects the communication time interval based on a time stamp contained in a real time transport protocol message of the IP packet.

8. The relay apparatus according to claim 4, further comprising cell segmentation unit for segmenting the first and second packets received by said packet receiving unit into the ATM cells,
   ATM output control unit for outputting the ATM cells segmented by said cell segmentation unit to an ATM connection as the channel, and
   switch control unit for controlling said ATM output control unit to output preferentially the ATM cells corresponding to the first packet, when the ATM cells corresponding to the first and second packets are mingled and input into said ATM output control unit.

9. The relay apparatus according to claim 8, wherein said ATM connection has a service category set in GFR, and said switch control unit has a minimum cell rate corresponding to the ATM connection set by said band setting unit.

10. The relay apparatus according to claim 8, wherein said ATM connection has a service category set in VBR, and said switch control unit sets an average cell rate corresponding to the ATM connection by said band setting unit.

11. The relay apparatus according to claim 8, wherein said band setting unit repetitively sets the communication band at predetermined timings, after the virtual connection is set as the channel.

12. The relay apparatus according to claim 8, wherein said band setting unit sets the communication band, when a permanent virtual connection is set as the channel.

13. The relay apparatus according to claim 8, wherein said band setting unit sets the communication band, when a switch type virtual connection is set as the channel.

14. The relay apparatus according to claim 8, wherein said band setting unit sets the communication band when a call setup is made in accordance with an upper-level layer protocol that is higher than a hierarchy corresponding to the packet, after the virtual connection is set as the channel.

* * * * *